United States Patent
Wan

(10) Patent No.: US 12,551,137 B2
(45) Date of Patent: Feb. 17, 2026

(54) SYSTEMS AND METHODS FOR DETERMINING MOTION INFORMATION OF A SUBJECT

(71) Applicant: SHENZHEN UNITED IMAGING RESEARCH INSTITUTE OF INNOVATIVE MEDICAL EQUIPMENT INNOVATION RESEARCH, Guangdong (CN)

(72) Inventor: Qianqian Wan, Shenzhen (CN)

(73) Assignee: SHENZHEN UNITED IMAGING RESEARCH INSTITUTE OF INNOVATIVE MEDICAL EQUIPMENT INNOVATION RESEARCH, Shenzhen (CN)

( * ) Notice: Subject to any disclaimer, the term of this patent is extended or adjusted under 35 U.S.C. 154(b) by 573 days.

(21) Appl. No.: 18/061,999

(22) Filed: Dec. 5, 2022

(65) Prior Publication Data

US 2023/0172488 A1 Jun. 8, 2023

(30) Foreign Application Priority Data

Dec. 6, 2021 (CN) .......................... 202111481739.5

(51) Int. Cl.
*A61B 5/11* (2006.01)
*A61B 6/03* (2006.01)
(Continued)

(52) U.S. Cl.
CPC ................ *A61B 5/11* (2013.01); *A61B 6/032* (2013.01); *G06T 7/70* (2017.01); *G06T 7/80* (2017.01); *G06V 10/46* (2022.01); *G06V 40/20* (2022.01)

(58) Field of Classification Search
CPC ......... A61B 5/11; A61B 6/032; A61B 6/4417; A61B 6/037; A61B 6/5235; G06T 7/70;
(Continued)

(56) References Cited

U.S. PATENT DOCUMENTS

2004/0260176 A1 12/2004 Wollenweber et al.
2012/0169333 A1* 7/2012 Katscher ................. G06T 7/246
324/301
(Continued)

FOREIGN PATENT DOCUMENTS

CN 110215226 A 9/2019

*Primary Examiner* — Jerome Grant, II
(74) *Attorney, Agent, or Firm* — Poseidon Advanced IP LLC

(57) ABSTRACT

The present disclosure is related to systems and methods for determining motion information of a subject. The method may include obtaining a first image of a subject. The first image may be obtained by performing a first scan on the subject using a first medical device of a first modality. The method may include obtaining a second image of the subject. The second image may be obtained by an image acquisition device during a second scan. The second scan may be performed on the subject using a second medical device of a second modality. The method may include generating a first model of the subject based on the first image. The method may include generating a second model of the subject based on the second image. The method may include determining motion information of the subject based on the first model and the second model.

20 Claims, 7 Drawing Sheets

(51) Int. Cl.
  *G06T 7/70*    (2017.01)
  *G06T 7/80*    (2017.01)
  *G06V 10/46*   (2022.01)
  *G06V 40/20*   (2022.01)

(58) Field of Classification Search
  CPC ............. G06T 7/80; G06T 2207/10028; G06T 2207/10088; G06T 2207/10104; G06T 2207/20084; G06T 7/251; G06T 7/344; G06V 10/46; G06V 40/20; G06V 2201/03; G06V 10/763
  USPC ........................................................ 382/131
  See application file for complete search history.

(56) References Cited

U.S. PATENT DOCUMENTS

| | | |
|---|---|---|
| 2015/0117733 A1 | 4/2015 | Manjeshwar et al. |
| 2018/0368721 A1* | 12/2018 | Ahn ................. A61B 5/00 |
| 2020/0000424 A1 | 1/2020 | Spottiswoode et al. |
| 2020/0352524 A1 | 11/2020 | Hu et al. |

* cited by examiner

SYSTEMS AND METHODS FOR DETERMINING MOTION INFORMATION OF A SUBJECT

CROSS-REFERENCE TO RELATED APPLICATIONS

This application claims priority of Chinese Patent Application No. 202111481739.5, filed on Dec. 6, 2021, and the contents of which are hereby incorporated by reference.

TECHNICAL FIELD

This disclosure generally relates to systems and methods for medical imaging, and more particularly, relates to systems and methods for determining motion information of a subject in the medical imaging.

BACKGROUND

Medical systems (e.g., a PET-CT device, a PET-MRI device) are widely used for creating images of a patient's body, especially for internal structures, for medical diagnosis and/or treatment purposes. Generally, during a PET-CT scan of a patient, a CT scan may be performed on the patient when the patient is in a first position. After the CT scan, the patient may be moved to a second position, and a PET scan may be performed on the patient when the patient is in the second position. The patient may undergo a motion (e.g., a posture motion) when the patient moves from the first position to second position, which may affect imaging quality by reducing the accuracy of attenuation correction for a PET image based on a CT image, which in turn may hinder an accurate detection, localization, and/or quantification of possible lesions (e.g., a tumor). Therefore, it is desirable to provide effective systems or methods for determining motion information of a subject between scans in the medical imaging.

SUMMARY

According to an aspect of the present disclosure, a method for determining motion information of a subject may be implemented on a computing device including at least one processor and at least one storage device. The method may include obtaining a first image of a subject. The first image may be obtained by performing a first scan on the subject using a first medical device of a first modality. The method may include obtaining a second image of the subject. The second image may be obtained by an image acquisition device during a second scan. The second scan may be performed on the subject using a second medical device of a second modality. The method may include generating a first model of the subject based on the first image. The method may include generating a second model of the subject based on the second image. The method may include determining motion information of the subject based on the first model and the second model.

In some embodiments, the method may include obtaining a first transformation relationship between a first coordinate system associated with the first medical device and a reference coordinate system. The method may include generating the first model based on the first image and the first transformation relationship.

In some embodiments, the method may include obtaining a plurality of first elements of the first image by processing the first image. The plurality of first elements may correspond to an outer surface of the subject in the first image. The method may include determining coordinates of the plurality of first elements in the first coordinate system associated with the first medical device based on image coordinates of the plurality of first elements in an image coordinate system associated with the first image. The method may include generating an initial first model based on the coordinates of the plurality of first elements in the first coordinate system associated with the first medical device. The method may include generating the first model by transforming the initial first model from the first coordinate system to the reference coordinate system based on the first transformation relationship.

In some embodiments, the method may include obtaining the plurality of first elements by performing at least one of a binarization operation or a contour extraction processing operation on the first image.

In some embodiments, the reference coordinate system is a second coordinate system associated with the second medical device.

In some embodiments, the method may include obtaining a second transformation relationship between the reference coordinate system and a third coordinate system associated with the image acquisition device. The method may include generating the second model based on the second image and the second transformation relationship.

In some embodiments, the method may include obtaining coordinates of a plurality of second elements of the second image in the third coordinate system. The plurality of second elements may correspond to an outer surface of the subject in the second image. The method may include generating the second model based on the coordinates of the plurality of second elements of the second image in the third coordinate system and the second transformation relationship.

In some embodiments, the method may include obtaining coordinates of the plurality of second elements in the reference coordinate system based on the second transformation relationship. The method may include generating the second model based on the coordinates of the plurality of second elements in the reference coordinate system.

In some embodiments, the reference coordinate system is a second coordinate system associated with the second medical device. The method may include obtaining a plurality of intrinsic parameters of the image acquisition device and a plurality of extrinsic parameters of the image acquisition device. The method may include obtaining the second transformation relationship based on a position of the image acquisition device relative to the second medical device, the plurality of intrinsic parameters of the image acquisition device, and the plurality of extrinsic parameters of the image acquisition device.

In some embodiments, the method may include determining the motion information of the subject by registering the first model and the second model according to an iterative closest point algorithm.

In some embodiments, the first model may be a first point cloud model. The first point cloud model may represent posture information of the subject in the first scan. The second model may be a second point cloud model. The second point cloud model may represent posture information of the subject during the second scan.

In some embodiments, the method may include obtaining a third image of the subject based on the second scan of the subject.

In some embodiments, the first medical device may be a CT device. The second medical device may be a PET device. The first image may be a CT image. The third image may be a PET image. The method may include performing an attenuation correction operation on the PET image based on the CT image and the motion information of the subject.

According to another aspect of the present disclosure, a system for determining motion information of a subject may include at least one storage medium including a set of instructions, and at least one processor in communication with the at least one storage medium. When executing the set of instructions, the at least one processor may be directed to cause the system to perform a method. The method may include obtaining a first image of a subject. The first image may be obtained by performing a first scan on the subject using a first medical device of a first modality. The method may include obtaining a second image of the subject. The second image may be obtained by an image acquisition device during a second scan. The second scan may be performed on the subject using a second medical device of a second modality. The method may include generating a first model of the subject based on the first image. The method may include generating a second model of the subject based on the second image. The method may include determining motion information of the subject based on the first model and the second model.

According to another aspect of the present disclosure, a non-transitory computer readable medium may include at least one set of instructions. When executed by at least one processor of a computing device, the at least one set of instructions may cause the at least one processor to effectuate a method. The method may include obtaining a first image of a subject. The first image may be obtained by performing a first scan on the subject using a first medical device of a first modality. The method may include obtaining a second image of the subject. The second image may be obtained by an image acquisition device during a second scan. The second scan may be performed on the subject using a second medical device of a second modality. The method may include generating a first model of the subject based on the first image. The method may include generating a second model of the subject based on the second image. The method may include determining motion information of the subject based on the first model and the second model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
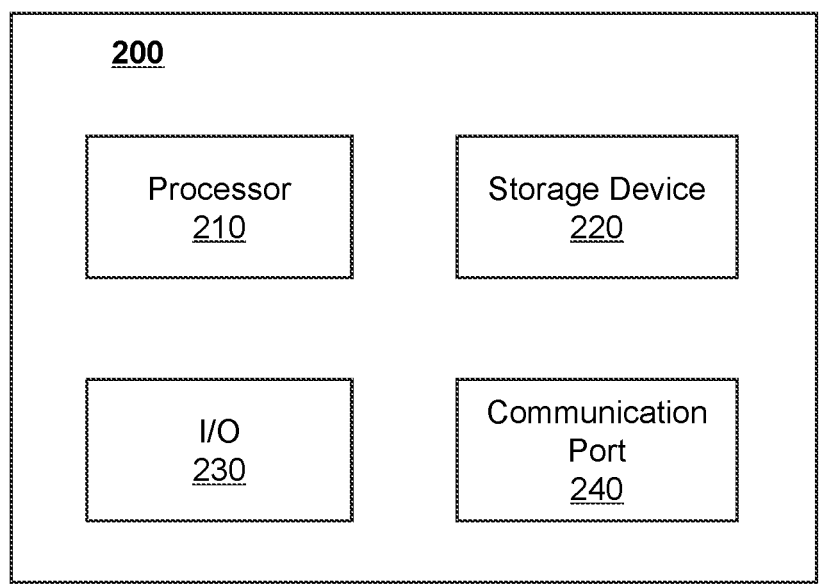
FIG. 2 is a schematic diagram illustrating exemplary hardware and/or software components of an exemplary computing device on which the processing device 120 may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., a processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "region," "location," and "area" in the present disclosure may refer to a location of an anatomical structure shown in the image or an actual location of the anatomical structure existing in or on a subject's body, since the image may indicate the actual location of a certain anatomical structure existing in or on the subject's body. The term "an image of a subject" may be referred to as the subject for brevity. Segmentation of an image of a subject may be referred to as segmentation of the subject.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for medical imaging. A processing device may obtain a first image (e.g., a CT image) of a subject. The first image may be obtained by performing a first scan (e.g., a CT scan) on the subject using a first medical device (e.g., a CT device) of a first modality. The processing device may obtain a second image (e.g., a depth image) of the subject. The second image may be obtained by an image acquisition device (e.g., a camera) during a second scan (e.g., at an initial time point of a PET scan). The second scan may be performed on the subject using a second medical device (e.g., a PET device) of a second modality. The processing device may generate a first model (e.g., a first point cloud model) of the subject based on the first image. The first model may represent posture information of the subject in the first scan. The processing device may generate a second model (e.g., a second point cloud model) of the subject based on the second image. The second model may represent posture information of the subject during the second scan (e.g., at the initial time point of the second scan). The processing device may determine motion information of the subject based on the first model and the second model. In some embodiments, the processing device may obtain a third image of the subject based on the second scan of the subject. The first medical device may be a CT device, the second medical device may be a PET device, the first image may be a CT image, and the third image may be a PET image. The processing device may perform an attenuation correction operation on the PET image based on the CT image and the motion information of the subject.

According to some embodiments of the present disclosure, the motion information of the subject between the first scan (e.g., the CT scan) and the initial time point of the second scan (e.g., the PET scan) may be determined based on the first image (e.g., the CT image) obtained by the first medical device (e.g., the CT device) and the second image (e.g., the depth image) obtained by the image acquisition device (e.g., the camera). The third image (e.g., the PET image) obtained by the second medical device (e.g., the PET device) may be corrected based on the CT image and the motion information of the subject, which may improve the accuracy of correction of the third image.

Figure 1:
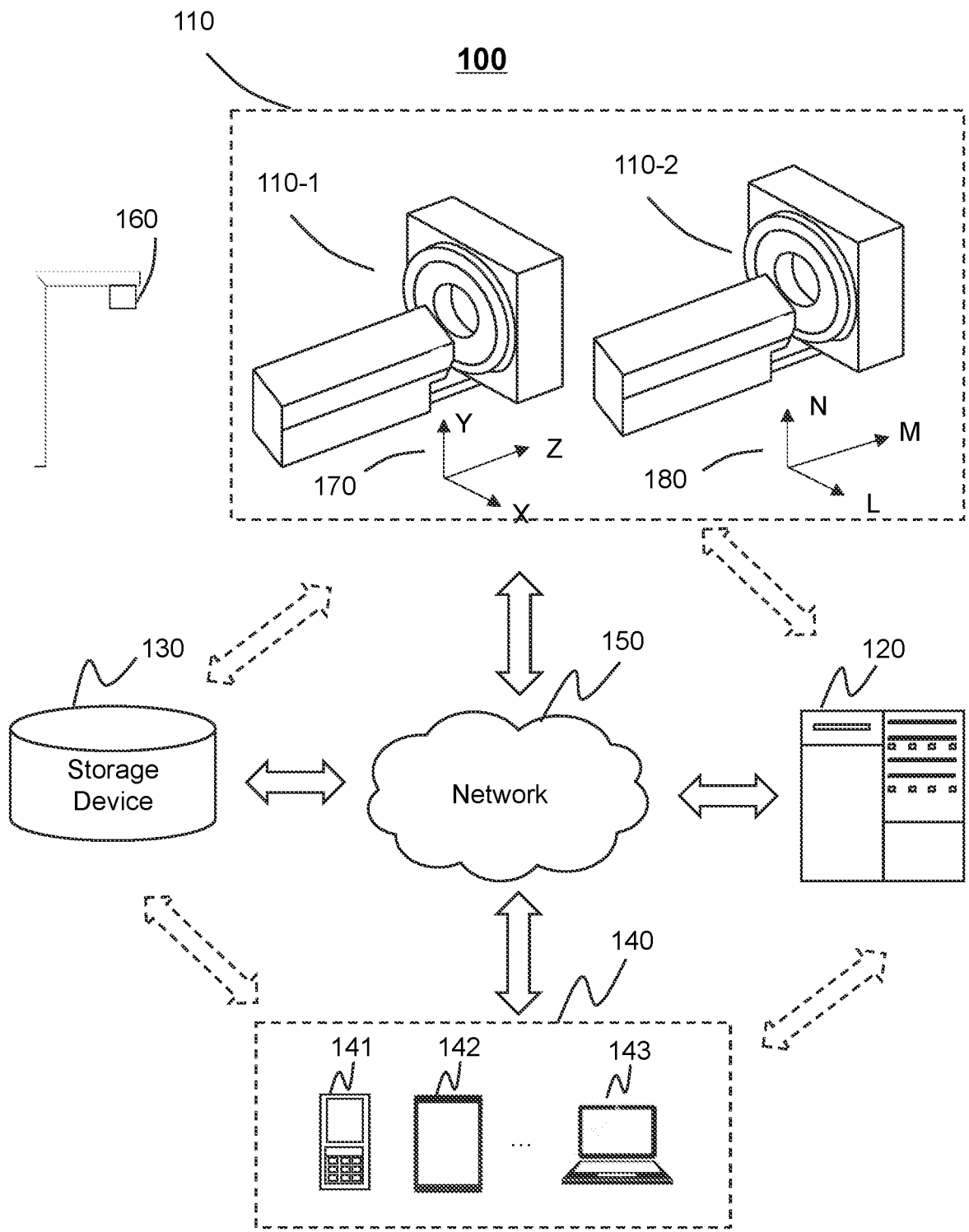
FIG. 1 is a schematic diagram illustrating an exemplary medical system according to some embodiments of the present disclosure.

FIG. 1 is a schematic diagram illustrating an exemplary medical system 100 according to some embodiments of the present disclosure. As shown, the medical system 100 may include a medical device 110, a processing device 120, a storage device 130, one or more terminals 140, a network 150, and an image acquisition device 160. In some embodiments, the medical device 110, the processing device 120, the storage device 130, the terminal(s) 140, and/or the image acquisition device 160 may be connected to and/or communicate with each other via a wireless connection, a wired connection, or a combination thereof. The connection between the components of the medical system 100 may be variable. For example, the medical device 110 may be connected to the processing device 120 through the network 150, or connected to the processing device 120 directly as illustrated by the bidirectional dotted arrow connecting the medical device 110 and the processing device 120 in FIG. 1. As another example, the terminal(s) 140 may be connected to the processing device 120 through the network 150, or connected to the processing device 120 directly as illustrated by the bidirectional dotted arrow connecting the terminal(s) 140 and the processing device 120 in FIG. 1. As still another example, the storage device 130 may be connected to the medical device 110 through the network 150, or connected to the medical device 110 directly as illustrated by the bidirectional dotted arrow connecting the medical device 110 and the storage device 130 in FIG. 1. As still another example, the storage device 130 may be connected to the terminal(s) 140 through the network 150, or connected to the terminal(s) 140 directly as illustrated by the bidirectional dotted arrow connecting the terminal(s) 140 and the storage device 130 in FIG. 1.

The medical device 110 may generate or provide image data related to a subject via scanning the subject. In some embodiments, the subject may include a biological subject and/or a non-biological subject. For example, the subject may include a specific portion of a body, such as the head, the thorax, the abdomen, or the like, or a combination thereof. As another example, the subject may be a man-made composition of organic and/or inorganic matters that are with or without life.

In some embodiments, the medical device 110 may be a non-invasive biomedical medical device for disease diagnostic or research purposes. The medical device 110 may include a single modality device and/or a multi-modality device. The single modality device may include, for example, an X-ray device, a computed tomography (CT) device, a magnetic resonance imaging (MRI) device, a positron emission tomography (PET) device, an optical coherence tomography (OCT) device, an ultrasound (US) device, an intravascular (IV) device, a near infrared spectroscopy (NIRS) device, a far infrared (FIR) device, or the like, or any combination thereof. The multi-modality device may include, for example, a PET-CT device, a PET-MRI device, etc. It should be noted that the medical device described above is merely provided for illustration purposes, and not intended to limit the scope of the present disclosure. The term "imaging modality" or "modality" as used herein broadly refers to an imaging method or technology that gathers, generates, processes, and/or analyzes imaging information of a subject.

In some embodiments, as illustrated in FIG. 1, the medical device 110 may include a first medical device 110-1 and a second medical device 110-2. In some embodiments, the first medical device 110-1 and the second medical device 110-2 may be two components of a device. In some embodiments, the first medical device 110-1 and the second medical device 110-2 may be two devices. The first medical device 110-1 may be used to perform a first scan on the subject. The second medical device 110-2 may be used to perform a second scan on the subject. The second scan may be performed after the first scan. For example, the medical device 110 may be a PET-CT device. The first medical device 110-1 may be a CT device, and the second medical device 110-2 may be a PET device. As another example, the medical device 110 may be an image guided radiation therapy (IGRT) device. The first medical device 110-1 may be an imaging device (e.g., a CT device), and the second medical device 110-2 may be a treatment device (e.g., a RT device). As still another example, the medical device 110 may be a PET-MRI device. The first medical device 110-1 may be an MRI device, and the second medical device 110-2 may be a PET device.

For illustration purposes, the present disclosure mainly describes systems and methods relating to a PET-CT system. It should be noted that the PET-CT system described below is merely provided as an example, and not intended to limit the scope of the present disclosure. The systems and methods disclosed herein may be applied to any other imaging systems.

The processing device 120 may process data and/or information obtained from the medical device 110, the storage device 130, the terminal(s) 140, and/or the image acquisition device 160. For example, the processing device 120 may obtain a first image of a subject. As another example, the processing device 120 may obtain a second image of a subject. As another example, the processing device 120 may generate a first model of a subject based on a first image. As another example, the processing device 120 may generate a second model of a subject based on a second image. As another example, the processing device 120 may determine motion information of a subject based on a first model and a second model. In some embodiments, the processing device 120 may be a single server or a server group. The server group may be centralized or distributed. In some embodiments, the processing device 120 may be local to or remote from the medical system 100. For example, the processing device 120 may access information and/or data from the medical device 110, the storage device 130, the terminal(s) 140, and/or the image acquisition device 160 via the network 150. As another example, the processing device 120 may be directly connected to the medical device 110, the terminal(s) 140, the storage device 130, and/or the image acquisition device 160 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

In some embodiments, the processing device 120 may include one or more processors (e.g., single-core processor(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 130 may store data, instructions, and/or any other information. In some embodiments, the storage device 130 may store data obtained from the processing device 120, the terminal(s) 140, the medical device 110, and/or the image acquisition device 160. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform as described elsewhere in the disclosure.

In some embodiments, the storage device 130 may be connected to the network 150 to communicate with one or more other components of the medical system 100 (e.g., the processing device 120, the terminal(s) 140). One or more components of the medical system 100 may access the data or instructions stored in the storage device 130 via the network 150. In some embodiments, the storage device 130 may be part of the processing device 120 or the terminal(s) 140.

The terminal(s) 140 may enable user interaction between a user and the medical system 100. In some embodiments, the terminal(s) 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 140 may include an input device, an output device, etc. In some embodiments, the terminal(s) 140 may be part of the processing device 120.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140) may communicate information and/or data with one or more other components of the medical system 100 via the network 150. For example, the processing device 120 may obtain image data from the medical device 110 via the network 150. As another example, the processing device 120 may obtain user instruction(s) from the terminal(s) 140 via the network 150.

The network 150 may be or include a public network (e.g., the Internet), a private network (e.g., a local area network (LAN)), a wired network, a wireless network (e.g., a Wi-Fi network), a frame relay network, a virtual private network (VPN), a satellite network, a telephone network, routers, hubs, switches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

The image acquisition device 160 may be configured to capture image data of a subject before, during, and/or after the medical device 110 performs a scan on the subject. The image acquisition device 160 may be and/or include any suitable device that is capable of capturing the image data of the subject. For example, the image acquisition device 160 may include a camera (e.g., a digital camera, an analog camera, etc.), a red-green-blue (RGB) sensor, an RGB-depth (RGB-D) sensor, or another device that can capture color image data of the subject. As yet another example, the image acquisition device 160 may be used to obtain depth image data of the subject. The depth image data may refer to image data that includes depth information of each physical point on the body surface of the subject, such as a distance from each physical point to a specific point (e.g., an optical center of the image acquisition device 160). The depth image data may be captured by a range sensing device, e.g., a structured light scanner, a time-of-flight (TOF) device, a stereo triangulation camera, a sheet of light triangulation device, an interferometry device, a coded aperture device, a stereo matching device, or the like, or any combination thereof. In some embodiments, the processing device 120 and/or a processing device (e.g., a field programmable gate array (FPGA)) of the image acquisition device 160 may generate point-cloud data of the subject based on the depth image data of the subject. The point-cloud data may include a plurality of data points, each of which may represent a physical point on a body surface of the subject and can be described using one or more feature values of the physical point (e.g., feature values relating to the position and/or the composition of the physical point).

In some embodiments, the image acquisition device 160 may be a device independent from the medical device 110 as shown in FIG. 1. For example, the image acquisition device 160 may be a camera mounted on the ceiling in an examination room where the medical device 110 is located. Alternatively, the image acquisition device 160 may be integrated into or mounted on the medical device 110 (e.g., a gantry of the medical device 110). In some embodiments, the image data obtained by the image acquisition device 160 may be transmitted to the processing device 120 for further analysis. Additionally or alternatively, the image data obtained by the image acquisition device 160 may be transmitted to a terminal device (e.g., the terminal(s) 140) for display and/or a storage device (e.g., the storage device 130) for storage.

In some embodiments, the image acquisition device 160 may be configured to capture the image data of the subject continuously or intermittently (e.g., periodically) before, during, and/or after a scan of the subject performed by the medical device 110. In some embodiments, the acquisition of the image data by the image acquisition device 160, the transmission of the captured image data to the processing device 120, and the analysis of the image data may be performed substantially in real time so that the image data may provide information indicating a substantially real time status of the subject.

In some embodiments, a coordinate system associated with the medical device 110 may be provided for the medical system 100 to define a position of a component (e.g., an absolute position, a position relative to another component) and/or a movement of the component. For example, a first coordinate system 170 associated with the first medical device 110-1 (e.g., a CT device) may be provided for the first medical device 110-1. For illustration purposes, the first coordinate system 170 may include the X-axis, the Y-axis, and the Z-axis. The X-axis and the Z-axis shown in FIG. 1 may be horizontal, and the Y-axis may be vertical. As illustrated, a positive X direction along the X-axis may be from the left side to the right side of a scanning table viewed from the direction facing the front of the first medical device 110-1; a positive Y direction along the Y-axis may be from the lower part (or from the floor where the first medical device 110-1 stands) to the upper part of a gantry of the first medical device 110-1; and a positive Z direction along the Z-axis may be the direction in which the scanning table is moved from the outside into the first medical device 110-1 viewed from the direction facing the front of the first medical device 110-1.

As another example, a second coordinate system 180 associated with the second medical device 110-2 (e.g., a PET device) may be provided for the second medical device 110-2. For illustration purposes, the second coordinate system 180 may include the M-axis, the L-axis, and the N-axis. The M-axis and the L-axis shown in FIG. 1 may be horizontal, and the N-axis may be vertical. As illustrated, a positive L direction along the L-axis may be from the left side to the right side of a scanning table viewed from the direction facing the front of the second medical device 110-2; a positive N direction along the N-axis may be from the lower part (or from the floor where the second medical device 110-2 stands) to the upper part of a gantry of the second medical device 110-2; and a positive M direction along the M-axis may be the direction in which the scanning table is moved from the outside into the second medical device 110-2 viewed from the direction facing the front of the second medical device 110-2.

It should be noted that the provided first coordinate system 170 and the second coordinate system 180 are illustrative, and not intended to limit the scope of the present disclosure. For example, the first coordinate system 170 (and/or the second coordinate system 180) may only include two axes (e.g., the X-axis and the Y-axis). In addition, although the following descriptions discuss through various examples to determine a position of an entity by determining a coordinate of an entity in a certain coordinate system, it should be understood that the position of the entity may be determined by determining a coordinate of the entity in another coordinate system (e.g., a coordinate system that has a known transformation relationship with the certain medical coordinate system). For the convenience of descriptions, coordinates of an entity along an X-axis, a Y-axis, and a Z-axis in a coordinate system are also referred to as an X-coordinate, a Y-coordinate, and a Z-coordinate of the entity in the coordinate system, respectively.

It should be noted that the above description of the medical system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the medical system 100 may include one or more additional components. In some embodiments, two or more components of the medical system 100 may be integrated into a single component. Merely by way of example, the processing device 120 (or a portion thereof) may be integrated into the medical device 110 or the image acquisition device 160.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth link, a Wi-Fi link, a WiMax link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
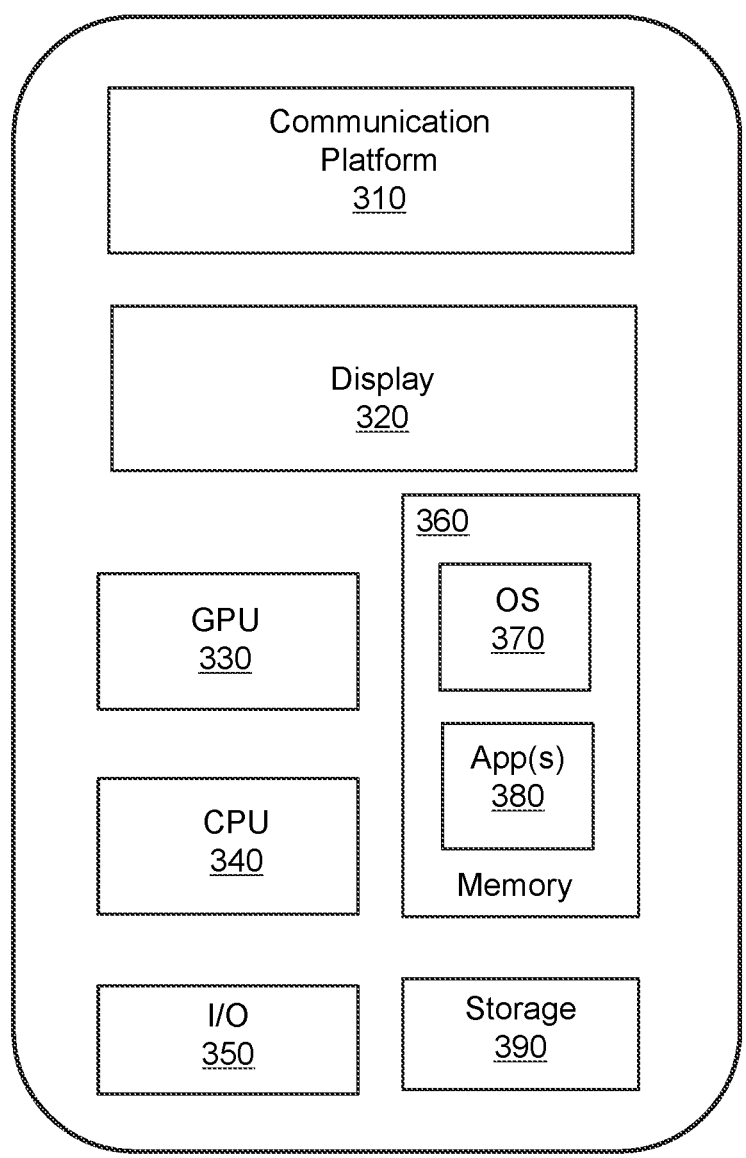
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth link, a Wi-Fi link, a WiMax link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data obtained by the medical device 110.

In some embodiments, a mobile operating system (OS) 370 (e.g., iOS, Android, Windows Phone, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
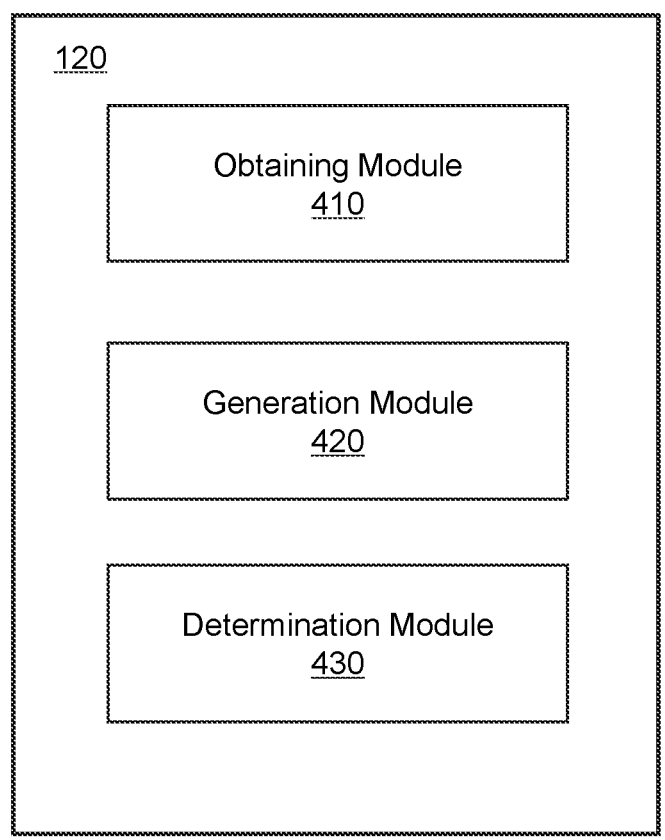
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include an obtaining module 410, a generation module 420, and a determination module 430.

The obtaining module 410 may be configured to obtain data and/or information associated with the medical system 100. The data and/or information associated with the medical system 100 may include a first image of a subject, a second image of the subject, a third image of the subject, or the like, or any combination thereof. In some embodiments, the obtaining module 410 may obtain the data and/or information associated with the medical system 100 from one or more components (e.g., the medical device 110, the storage device 130, the terminal 140, the image acquisition device 160) of the medical system 100 via the network 150.

The generation module 420 may be configured to generate a model of a subject based on an image of the subject. In some embodiments, the generation module 420 may generate a first model of a subject based on a first image. More descriptions for generating a first model of a subject may be found elsewhere in the present disclosure (e.g., operation 530 in FIG. 5, FIG. 6, and descriptions thereof). In some embodiments, the generation module 420 may generate a second model of a subject based on a second image. More descriptions for generating a second model of a subject may be found elsewhere in the present disclosure (e.g., operation 540 in FIG. 5, FIG. 7, and descriptions thereof).

The determination module 430 may be configured to determine motion information of a subject. In some embodiments, the determination module 430 may determine motion information of a subject based on a first model and a second model. For example, the determination module 430 may determine the motion information of the subject by registering the first model and the second model according to an iterative closest point (ICP) algorithm. More descriptions for determining the motion information may be found elsewhere in the present disclosure (e.g., operation 550 in FIG. 5 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the generation module 420 and the determination module 430 may be combined into a single module. In some embodiments, one or more modules may be added or omitted in the processing device 120. For example, the processing device 120 may further include a storage module (not shown in FIG. 4) configured to store data and/or information (e.g., a first image, a second image, a third image, a first model, a second model, motion information) associated with the medical system 100.

Figure 5:
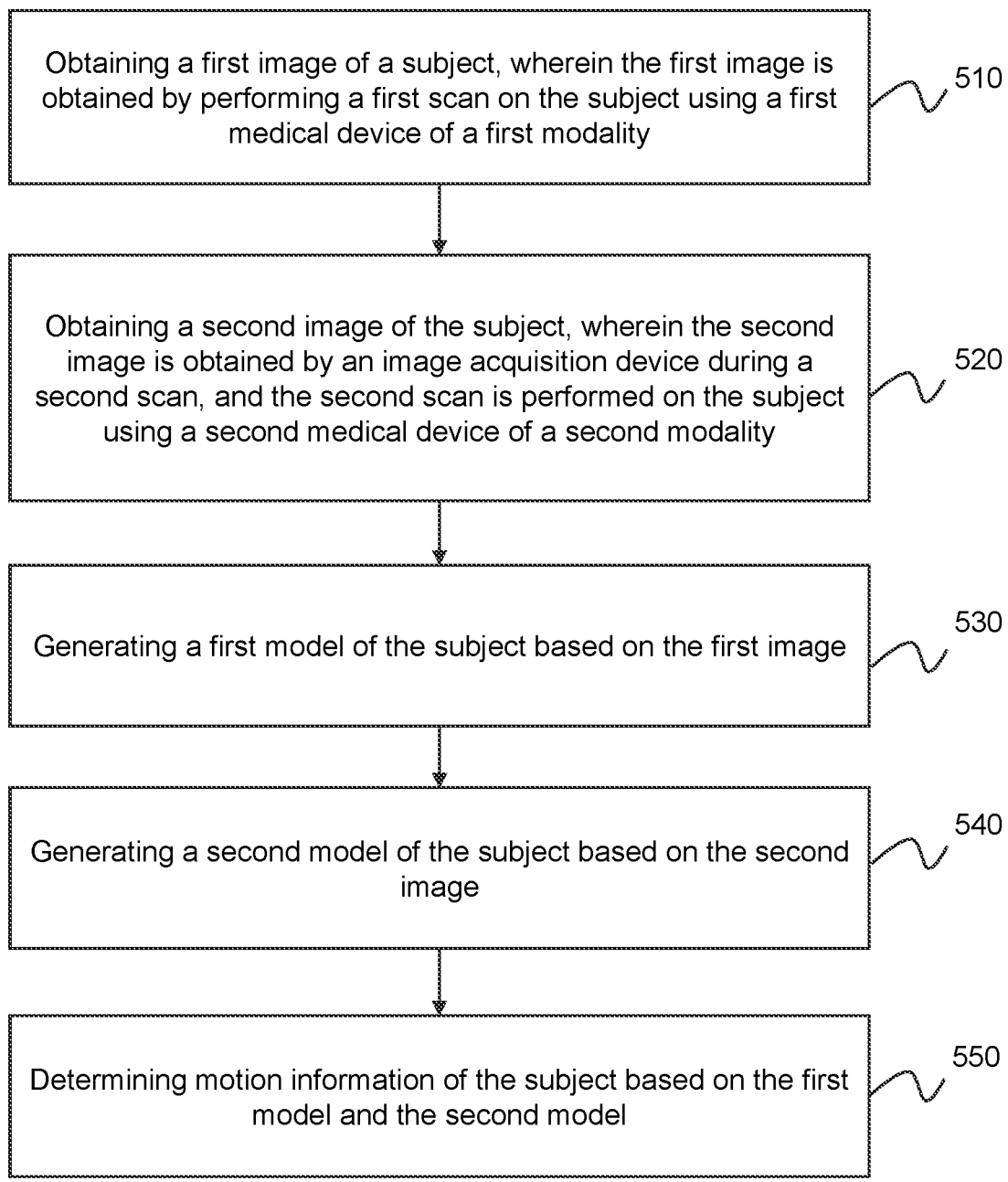
FIG. 5 is a flowchart illustrating an exemplary process for medical imaging according to some embodiments of the present disclosure.

FIG. 5 is a flowchart illustrating an exemplary process for medical imaging according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) may obtain a first image of a subject. The first image may be obtained by performing a first scan on the subject using a first medical device of a first modality.

In some embodiments, the subject may be a biological subject (e.g., a patient) and/or a non-biological subject to be scanned (e.g., imaged or treated) by the medical device (e.g., the medical device 110). An image (e.g., the first image, a second image) of the subject refers to image data corresponding to the entire subject or image data corresponding to a portion of the subject. In some embodiments, the first image of the subject may include a two-dimensional (2D) image, a three-dimensional (3D) image, a four-dimensional (4D) image (e.g., a series of images over time), and/or any related image data (e.g., scan data, projection data). In some embodiments, the first image of the subject may include a CT image, an MRI image, an ultrasound (US) image, an X-ray image, or the like.

In some embodiments, the first image may be obtained by performing the first scan on the subject using the first medical device of the first modality. In some embodiments, the first medical device (e.g., the first medical device 110-1) may be an X-ray imaging device (e.g., a suspended X-ray imaging device, a C-arm X-ray imaging device), a digital radiography (DR) device (e.g., a mobile digital X-ray imaging device), a CT device (e.g., a CBCT device, an MSCT device), an MRI device, or the like, as described elsewhere in the present disclosure. For example, the first image may be a CT image obtained by performing a CT scan on the subject using a CT device.

In some embodiments, the processing device 120 may obtain the first image from one or more components (e.g., the medical device 110, the terminal 140, and/or the storage device 130) of the medical system 100 or an external storage device via the network 150. For example, the first medical device 110-1 may transmit obtained imaging data (e.g., projection data) to the storage device 130, or any other storage device for storage. The processing device 120 may obtain the imaging data from the storage device 130 or any other storage device, and reconstruct the first image based on the imaging data. As another example, the processing device 120 may obtain the first image from the first medical device 110-1 directly. In some embodiments, the processing device 120 may obtain the first image from the I/O 230 of the computing device 200 via the communication port 240, and/or the I/O 350 of the mobile device 300 via the communication platform 310.

In 520, the processing device 120 (e.g., the obtaining module 410) may obtain a second image of the subject. The second image may be obtained by an image acquisition device during a second scan. The second scan may be performed on the subject using a second medical device of a second modality.

In some embodiments, the second image of the subject may include a 2D image, a 3D image, a 4D image, or the like. In some embodiments, the second image of the subject may include color image data, point-cloud data, depth image data, mesh data, or the like, or any combination thereof.

In some embodiments, the processing device 120 may obtain the second image from the image acquisition device (e.g., the image acquisition device 160). Alternatively, the second image may be obtained by the image acquisition device and stored in a storage device (e.g., the storage device 130, the storage device 220, the storage 390, an external source). The processing device 120 may retrieve the second image from the storage device.

In some embodiments, the second image may be obtained by the image acquisition device at any time point during the second scan. In some embodiments, the second image may be obtained by the image acquisition device at an initial time point of the second scan. The second scan may be performed on the subject using the second medical device of the second modality. In some embodiments, the second scan (e.g., the PET scan) may be performed after the first scan (e.g., the CT scan). In some embodiments, the second scan may be performed before the first scan. The second modality may be different from the first modality. For example, the first scan may be a CT scan and the second scan may be a PET scan. The first image (e.g., a CT image) may be obtained by performing the CT scan on the subject using a CT device when the subject is positioned at a first position. Then the subject may be moved from the first position to a second position for receiving the second scan. The second image may be captured by the image acquisition device after the subject is positioned at the second position for receiving the second scan. For example, after the subject is placed on a scanning table of the second medical device, the image acquisition device may be directed to capture the second image of the subject.

In some embodiments, the first image (and/or the second image) may be original image data obtained by the medical device or the image acquisition device. Alternatively, the first image (and/or the second image) may be determined by processing the original image data. For example, the processing device 120 may perform a denoising operation on the original image data to generate denoised image data, and determine the denoised image data as the first image (or the second image) of the subject. As another example, the processing device 120 may perform a gray-scale processing operation on the original image data to generate processed image data, and determine the processed image data as the first image (or the second image) of the subject.

In 530, the processing device 120 (e.g., the generation module 420) may generate a first model of the subject based on the first image.

As used herein, a first model of a subject determined based on a first image of the subject refers to a model representing an appearance of the subject when the first image is obtained. For example, the first model may indicate a contour and/or a posture of the subject when the first image is obtained (i.e., during the first scan). A posture of a subject may reflect one or more of a position, a pose, a shape, a size, etc., of the subject (or a portion thereof).

In some embodiments, the first model may include a 3D mesh model, a point cloud model, or the like, or any combination thereof. A 3D mesh model of a subject may include a plurality of vertices, edges, and faces that define a 3D shape of the subject. A point cloud model of a subject may include a plurality of points that define a 3D shape of the subject. A point of the point cloud model may correspond to a physical point or a region of the subject.

In some embodiment, the processing device 120 may generate the first model (e.g., the 3D mesh model) of the subject based on the first image according to one or more mesh generation techniques, such as a triangular/tetrahedral (Tri/Tet) technique (e.g., an octree algorithm, an advancing front algorithm, a delaunay algorithm, etc.), a quadrilateral/hexahedra (Quad/Hex) technique (e.g., a trans-finite interpolation (TFI) algorithm, an elliptic algorithm, etc.), a hybrid technique, a parametric model based technique, a surface meshing technique, or the like, or any combination thereof.

In some embodiments, the processing device 120 may generate the first model (e.g., the point cloud model) of the subject based on the first image and a first transformation relationship between a first coordinate system (e.g., the first coordinate system 170) associated with the first medical device (e.g., the first medical device 110-1) and a reference coordinate system (e.g., a second coordinate system (e.g., the second coordinate system 180) associated with the second medical device (e.g., the second medical device 110-2)). More descriptions for generating the first model may be found elsewhere in the present disclosure (e.g., FIG. 6 and descriptions thereof).

In 540, the processing device 120 (e.g., the generation module 420) may generate a second model of the subject based on the second image.

As used herein, a second model of a subject determined based on a second image of the subject refers to a model representing an appearance of the subject when the second image is obtained. For example, the second model may indicate a contour and/or a posture of the subject when the second image is obtained (i.e., at the initial time point of the second scan).

In some embodiments, the second model may include a 3D mesh model, a point cloud model, or the like, or any combination thereof. In some embodiments, the processing device 120 may generate the second model based on the second image and a second transformation relationship between the reference coordinate system (e.g., the second coordinate system associated with the second medical device) and a third coordinate system associated with the image acquisition device. More descriptions for generating the second model may be found elsewhere in the present disclosure (e.g., FIG. 7 and descriptions thereof).

In 550, the processing device 120 (e.g., the determination module 430) may determine motion information of the subject based on the first model and the second model.

In some embodiments, the motion information may include information relating to a motion of the subject between the first scan and the second scan (e.g., the initial time point of the second scan). For example, the motion information may include a motion amplitude, a motion direction, or the like, or any combination thereof.

In some embodiments, the processing device 120 may determine the motion information of the subject by registering the first model and the second model according to one or more registration algorithms. The one or more registration algorithms may include an iterative closest point algorithm, a radial basis function (e.g., a thin-plate or surface splines transformation, a multiquadric transformation, a compactly-supported transformation), a physical continuum model, a large deformation model (e.g., diffeomorphisms), or the like, or any combination thereof.

In some embodiments, the processing device 120 may register the first model and the second model according to an iterative closest point algorithm. For example, a plurality of first feature points may be identified in the first model, and a plurality of second feature points may be identified in the second model. A feature point (e.g., the first feature point, the second feature point) may correspond to a specific physical point of the subject, such as a facial feature (e.g., a nose, an eye, a mouth, an eyebrow) or another representative physical point in a body region (e.g., the head, the neck, a hand, a leg, a foot, a spine, a pelvis, a hip) of the subject, or a marker point preset on the subject. In some embodiments, the first feature point and/or the second feature point may be annotated manually by a user (e.g., a doctor, an imaging specialist, a technician) on an interface (e.g., implemented on the terminal 140) that displays the first model and/or the second model. Alternatively, the first feature point and/or the second feature point may be generated by a computing device (e.g., the processing device 120) automatically according to an image analysis algorithm (e.g., an image segmentation algorithm, a feature point extraction algorithm).

The processing device 120 may determine first feature information of each of the plurality of first feature points. The processing device 120 may determine second feature information of each of the plurality of second feature points. Feature information of a feature point (e.g., the first feature information of the first feature point, the second feature information of the second feature point) may include a location of the feature point, image feature of the feature point (e.g., a gray value, a brightness value, a pixel (voxel) value, a gradient value). The processing device 120 may determine a mapping relationship between the plurality of first feature points in the first model and the plurality of second feature points in the second model based on the first feature information of the plurality of first feature points and the second feature information of the plurality of second feature points. As used herein, "a first feature point and a corresponding second feature point in a mapping relationship" refers to that the first feature point and the second feature point correspond to a same physical point of a subject.

For example, the processing device 120 may determine a first feature descriptor of each of the plurality of first feature points in the first model, and a second feature descriptor of each of the plurality of second feature points in the second model. A feature descriptor of a feature point (e.g., the first feature descriptor of the first feature point, the second feature descriptor of the second feature point) may be determined based on the feature information of the feature point. The processing device 120 may determine the mapping relationship between the plurality of first feature points in the first model and the plurality of second feature points in the second model based on a similarity degree (e.g., a location similarity degree, a feature similarity degree) between the first feature descriptor of each of the plurality of first feature points, and the second feature descriptor of each of the plurality of second feature points. In response to determining that a similarity degree between a first feature descriptor of a specific first feature point in the first model and a second feature descriptor of a specific second feature point in the second model is greater than a similarity threshold (e.g., 85%, 90%, 95%, 99%). The processing device 120 may determine that the specific first feature point in the first model corresponds to the specific second feature point in the second model.

In some embodiments, the processing device 120 may determine the mapping relationship between the plurality of first feature points in the first model and the plurality of second feature points in the second model according to a machine learning algorithm (e.g., an LOARX algorithm), a principal component analysis (PCA) algorithm, a fast point feature histogram (FPFH) algorithm, a Kdtree algorithm (e.g., a Kdtree minimum distance algorithm based on global search idea), or the like. For example, distances (e.g., Euclidean distances, squared difference distances) corresponding to the plurality of first feature points in the first model may be determined according to the Kdtree algorithm. For each point of the plurality of first feature points in the first model, a corresponding second feature point in the second model may be determined according to a nearest neighbor search algorithm.

In some embodiments, the processing device 120 may determine a deformation field representing the mapping relationship between the plurality of first feature points in the first model and the plurality of second feature points in the second model. In some embodiments, the deformation field may include a plurality of vectors each of which corresponds to a first feature point in the first model. Take a specific vector as an example, a direction of the vector represents a direction in which a corresponding first feature point in the first model shall move in order to reach a position of a corresponding second feature point in the second model; a magnitude of the vector represents a distance that the first feature point in the first model shall travel in the corresponding direction in order to reach the position of the corresponding second feature point in the second model.

The processing device 120 may register the first model and the second model based on the mapping relationship between the plurality of first feature points in the first model and the plurality of second feature points in the second model to generate a registration result. In some embodiments, the processing device 120 may register the first model and the second model based on all the first feature points and corresponding second feature points in the mapping relationship between the plurality of first feature points in the first model and the plurality of second feature points in the second model. In some embodiments, the processing device 120 may delete one or more first feature points and corresponding second feature points in the mapping relationship between the plurality of first feature points in the first model and the plurality of second feature points in the second model, in order to improve the accuracy of the registration result. For example, the processing device 120 may delete the one or more first feature points and the corresponding second feature points based on the feature information of the one or more first feature points and the feature information of the corresponding second feature points. Further, the processing device 120 may determine the motion information based on the registration result.

In some embodiments, the processing device 120 may register the first model and the second model according to a probability distribution-based normal distributions transform (NDT) algorithm, a deep learning-based PointNet++ algorithm, a point cloud transformer (PCT) algorithm, or the like. For example, a normal distribution of the first model may be determined according to the NDT algorithm. Transformation parameters of the second model may be updated based on the first model and the second model, such that a normal distribution of a transformed second model is similar to the normal distribution of the first model. Specifically, the first model may be divided into a plurality of grids. The sizes of the plurality of grids may be the same. Each grid may include a group of points. For each group of a plurality of groups of points corresponding to the plurality of grids of the first model, an average value, a covariance matrix, and a normal distribution function may be determined based on element values (e.g., pixel values, voxel values) of the group of points. An initial transformation for the second model may be determined. The transformed second model may be determined based on the initial transformation for the second model. Probability distribution functions for points of the transformed second model may be determined based on the grids of the first model. A product of the maximum likelihood values of all points of the transformed second model may be determined according to an iterative method. A registration transformation between the second model and the first model may be determined based on the product of the maximum likelihood values of all points of the transformed second model.

In some embodiments, the processing device 120 may register the first model and the second model using a registration model. The registration model refers to a model (e.g., a machine learning model) or an algorithm for registering a first model and a second model. For example, the processing device 120 may input the first model and the second model into the registration model, and the registration model may output a registration result of the first model and the second model. In some embodiments, the registration model may be obtained by training a preliminary model using a plurality of training samples. In some embodiments, the registration model may be predetermined by a computing device (e.g., the processing device 120 or a computing device of a vendor of the dose simulation model) and stored in a storage device (e.g., the storage device 130, the storage 220, the storage 390, or an external source). The processing device 120 may obtain the registration model from the storage device. Alternatively, the processing device 120 may determine the registration model by performing a training.

In some embodiments, the processing device 120 may obtain a third image of the subject based on the second scan of the subject. Take a PET-CT scan of the subject as an example, the first medical device may be a CT device, the second medical device may be a PET device, the first image may be a CT image, and the third image may be a PET image. The processing device 120 may perform an attenuation correction operation on the PET image based on the CT image and the motion information of the subject.

In some embodiments, the processing device 120 may determine an attenuation map of the subject based on the CT image. The attenuation map may include a plurality of attenuation coefficients of the radiation rays penetrated through the scanned subject. For example, the attenuation map may be generated based on the attenuation coefficients of voxels in the CT image. The processing device 120 may correct the attenuation map based on the motion information of the subject. For example, the processing device 120 may register the CT image and the PET image based on the motion information (e.g., the registration result between the first model and the second model) of the subject. A corrected attenuation map may be generated based on the registered CT image. The processing device 120 may then perform the attenuation correction operation on the PET image based on the corrected attenuation map. For example, the processing device 120 may determine attenuation correction information based on the corrected attenuation map. Specifically, a forward projection may be performed on the corrected attenuation map to determine a project of the corrected attenuation map. Merely by way of example, a natural logarithm of the opposite value of the projection of the corrected attenuation map may be designated as the attenuation correction information. In some embodiments, the attenuation correction information may be stored in the form of a sinogram (also refer to as the attenuation correction sinogram). The attenuation correction sinogram may include one or more elements corresponding to lines of response (LORs). An element may indicate the attenuation of the photons in the corresponding LOR.

Further, the processing device 120 may reconstruct the PET image based on the attenuation correction information according to one or more reconstruction algorithms. Exemplary reconstruction algorithms may include an iterative reconstruction algorithm (e.g., a maximum likelihood expectation maximization (MLEM) algorithm, an ordered subset expectation maximization (OSEM) algorithm, a maximum-likelihood reconstruction of attenuation and activity (MLAA) algorithm, a maximum-likelihood attenuation correction factor (MLACF) algorithm, a maximum likelihood transmission reconstruction (MLTR) algorithm, a conjugate gradient algorithm, a maximum-a-posteriori estimation algorithm, a filtered back projection (FBP) algorithm, a 3D reconstruction algorithm, or the like, or any combination thereof.

In some embodiments, the processing device 120 may register the CT image and the PET image based on the motion information of the subject. For example, the processing device 120 may generate a registered CT image by registering the CT image and the PET image based on the motion information of the subject. The processing device 120 may generate the attenuation map based on the registered CT image. The processing device 120 may perform the attenuation correction operation on the PET image based on the attenuation map.

In some embodiments, due to the limitations of the installation position, the installation angle, the focal length, and the field of vision of the image acquisition device, the image acquisition device cannot monitor the movement of the subject when the subject moves from the first position that the first scan is perform on the subject to the second position that the second scan is performed on the subject, but the image acquisition device may obtain the second image of the subject at the initial time point of the second scan when the subject is positioned at the second position.

According to some embodiments of the present disclosure, the motion information of the subject between the first scan (e.g., the CT scan) and the initial time point of the second scan (e.g., the PET scan) may be determined based on the first image (e.g., the CT image) obtained by the first medical device (e.g., the CT device) and the second image (e.g., a depth image) obtained by the image acquisition device (e.g., the camera). The third image (e.g., the PET image) obtained by the second medical device (e.g., the PET device) may be corrected based on the CT image and the motion information of the subject. For example, the attenuation correction operation may be performed on the PET image based on the CT image and the motion information of the subject, which may improve the accuracy of correction of the PET image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiment, if a time interval between a first scan time of the first scan and a second scan time of the second scan is relatively long (e.g., longer than a time threshold), a change of the subject between the first scan time of the first scan and the second scan time of the second scan may be determined. The change of the subject may include weight loss or increase, injury, or the like. In response to determining that the change of the subject between the first scan time of the first scan and the second scan time of the second scan is relatively large (e.g., larger than a threshold), it may indicate that the change of the subject between the first scan time and the second scan time affects the registration of the first model and the second model, and the determination of motion information. Accordingly, in some embodiments, the processing device 120 may correct the first image and/or the second image based on the change of the subject between the first scan time and the second scan time to generate a corrected first image and/or a corrected second image. The first model may be generated based on the corrected first image. The second model may be generated based on the corrected second image. Alternatively, the first scan and/or the second scan may be performed on the subject again to obtain an updated first image and/or an updated second image. The first model may be generated based on the updated first image. The second model may be generated based on the updated second image.

In some embodiments, the processing device 120 may register the first image (e.g., the CT image) and the third image (e.g., the PET image) based on the motion information in a plurality of scans of a plurality of subjects. A plurality of groups of registered first images and corresponding third images and a plurality of groups of first images and corresponding third images may be used for training an image registration model. The image registration model refers to a model (e.g., a machine learning model) or an algorithm for registering an image A of a modality A with an image B of a modality B. In some embodiments, the image A and/or the image B may be medical images. For example, the image A and/or the image B may include a CT image, an MR image, a PET image, an ultrasound (US) image, an X-ray image, or the like. In some embodiments, the image A and/or the image B may include a 2D image, a 3D image, a 4D image, or the like. In some embodiments, the modality A may be different from the modality B. For example, the image A may be an MRI image obtained by an MRI device, and the image B may be a CT image, a PET image, an X-ray image, a US image, or the like. As another example, the image A may be a CT image obtained by a CT device, and the image B may be an MRI image, a PET image, an X-ray image, a US image, or the like.

In some embodiments, the image registration model may be constructed based on a convolutional neural network model (CNN), a fully convolutional neural network (FCN) model, a generative adversarial network (GAN) model, or the like, or any combination thereof. For illustration purposes, a CT image-PET image registration process is taken as an example, the processing device 120 may obtain a CT image of a subject obtained by a CT device. The processing device 120 may obtain a PET image of the subject obtained by a PET device. The processing device 120 may input the CT image and the PET image into the image registration model. The image registration model may output a registration result of the CT image and the PET image. Generally, because the difference between the resolution of the PET image and the resolution of the CT image is relatively large, and the PET image and the CT image have different types of artifacts, the image registration process of the CT image and the PET image may be difficult. According to some embodiments of the present disclosure, the PET image and the CT image may be registered using the image registration model, which may improve the efficiency and accuracy of image registration.

Figure 6:
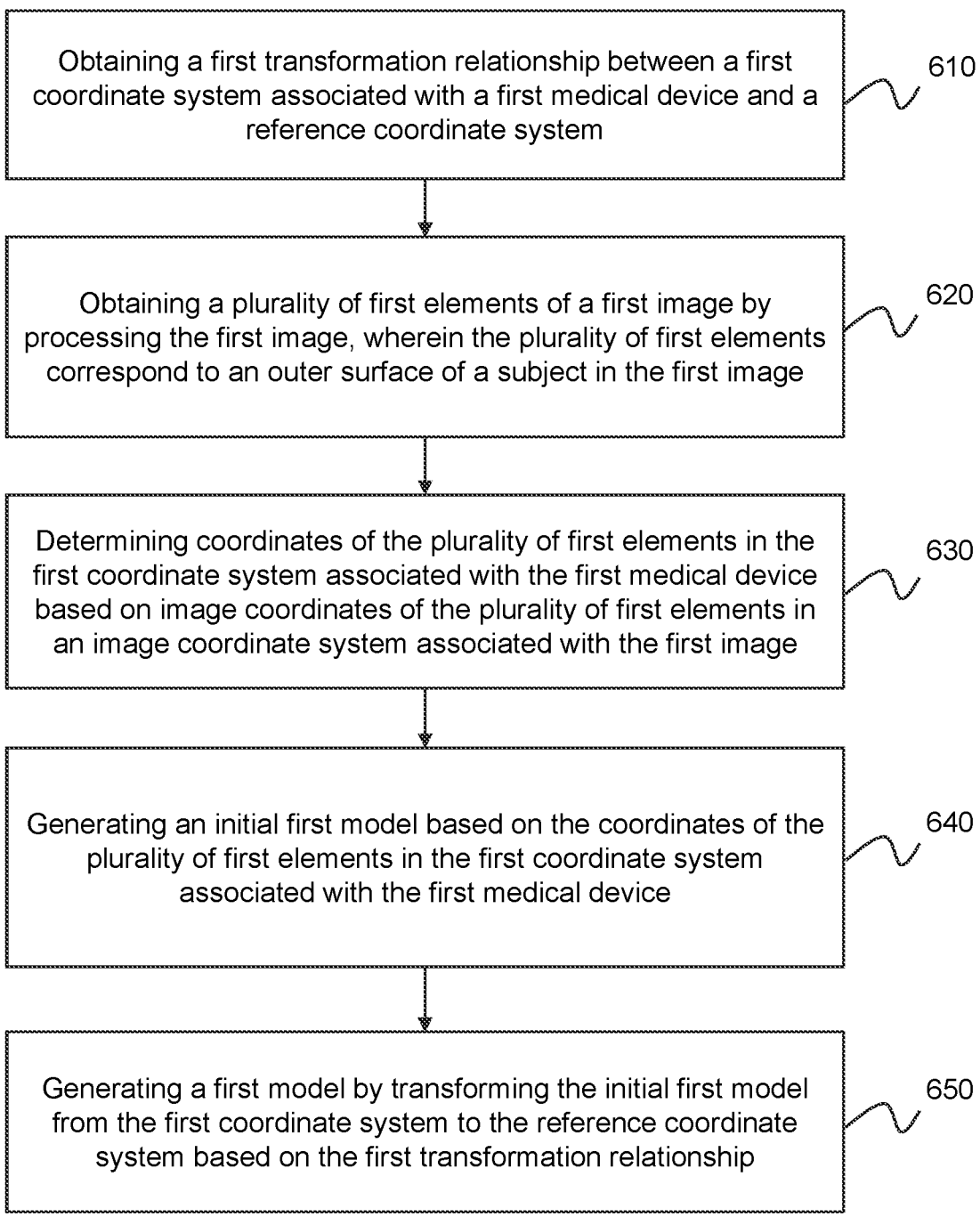
FIG. 6 is a flowchart illustrating an exemplary process for generating a first model of a subject based on a first image according to some embodiments of the present disclosure.

FIG. 6 is a flowchart illustrating an exemplary process for generating a first model of a subject based on a first image according to some embodiments of the present disclosure. In some embodiments, the first model may include a plurality of points in a reference coordinate system (e.g., a second coordinate system associated with a second medical device), corresponding to a plurality of first elements indicating an outer surface of the subject in the first image. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 120 (e.g., the generation module 420) may obtain a first transformation relationship between a first coordinate system associated with a first medical device and a reference coordinate system (e.g., a second coordinate system associated with a second medical device).

In some embodiments, the reference coordinate system may be any coordinate system that has a known transformation relationship with the first coordinate system and the third coordinate system. The reference coordinate system may be established by one or more components (e.g., the processing device 120) of the medical system 100, or a user of the medical system 100, and stored in a storage device of the medical system 100. The first transformation relationship between the first coordinate system associated with the first medical device (e.g., the first coordinate system 170 associated with the first medical device 110-1 as illustrated in FIG. 1) and the reference coordinate system (e.g., the second coordinate system 180 associated with the second medical device 110-2 as illustrated in FIG. 1) may represent a position relationship between the first coordinate system and the reference coordinate system (e.g., the second coordinate system).

In some embodiments, the first transformation relationship may be determined by one or more components (e.g., the processing device 120) of the medical system 100, or a user of the medical system 100, and stored in a storage device of the medical system 100. The processing device 120 may access the storage device and retrieve the first transformation relationship. For example, in a calibration process of the first medical device and/or the second medical device, the first transformation relationship between the first coordinate system and the second coordinate system may be determined using a phantom.

In some embodiments, the first transformation relationship may be represented by a rotation matrix and a translation matrix. Merely by way of example, the first transformation relationship may be determined according to Equation (1):

$$X_{PET} = R \times X_{CT} + T \tag{1},$$

where $X_{PET}$ refers to three-dimensional coordinates of a specific point in the second coordinate system (e.g., a PET coordinate system); $X_{CT}$ refers to three-dimensional coordinates of the specific point in the first coordinate system (e.g., a CT coordinate system); R refers to a rotation matrix; and T refers to a translation matrix.

In 620, the processing device 120 (e.g., the generation module 420) may obtain a plurality of first elements of a first image by processing the first image. The plurality of first elements may correspond to an outer surface of a subject in the first image.

As used herein, an element of an image refers to a pixel or a voxel of the image. In some embodiments, the plurality of first elements may correspond to a contour of the subject in the first image.

In some embodiments, the processing device 120 may obtain the plurality of first elements by performing a binarization operation and/or a contour extraction processing operation on the first image. The binarization operation may be used to realize a gray processing of the first image. For example, the processing device 120 may obtain a binary image by performing the binarization operation on the first image. A gray value of an element in the binary image may be "0" or "1." Merely by way of example, the elements of the binary image corresponding to the outer surface of the subject may have the value of "1," and the elements of the binary image corresponding to a region other than the outer surface of the subject may have the value of "0." The contour extraction processing operation may be used to extract the contour of the subject in the first image. For example, the processing device 120 may perform the contour extraction processing operation on the first image according to an image gradient algorithm.

In 630, the processing device 120 (e.g., the generation module 420) may determine coordinates of the plurality of first elements in the first coordinate system associated with the first medical device based on image coordinates of the plurality of first elements in an image coordinate system associated with the first image.

As used herein, an image coordinate system associated with a medical image (e.g., the first image) refers to a coordinate system that describes positions of pixels or voxels in an image obtained by a medical device (e.g., the first medical device 110-1).

In some embodiments, the first image (e.g., a CT image) may be stored in a digital imaging and communications in medicine (DICOM) format. As used herein, a DICOM may refer to a standard for image data storage and transfer. The DICOM may use a specific file format and a communication protocol to define a medical image format that can be used for data exchange that meets clinical needs in terms of image quality.

In some embodiments, the first image with the DICOM format may include tag data. The tag data may describe one or more types of identification information related to the first image. The identification information related to the first image may include information related to a patient (e.g., an identification (ID) number, a name, the gender, the age, a date of birth, a scan region, a position), information related to an operation (e.g., a scan) of the patient (e.g., a scanning parameter), information related to a medical device that performs the operation on the patient (e.g., a modality of the medical device), information related to an image of the patient (e.g., a size, a density resolution, a spatial resolution, a signal-to-noise ratio, an image reconstruction parameter, a position, an orientation), or the like, or any combination thereof. In some embodiments, the tag data may be in a form of a collection of numbers.

In some embodiments, the processing device 120 may determine the coordinates of the plurality of first elements in the first coordinate system associated with the first medical device based on the image coordinates of the plurality of first elements in the image coordinate system associated with the first image and the tag data of the first image (e.g., a patient position (0018, 5100), an image position (patient) (0020, 0032), an image orientation (patient) (0020, 0037)).

The tag data of image position may represent coordinates of an upper left corner of the first image in a patient coordinate system. In some embodiments, in the patient coordinate system, a positive X direction along an X-axis may be from the left side to the right side of a patient viewed from the direction facing the front of the patient; a positive Z direction along the Z-axis may be from the lower part (e.g., the feet) to the upper part (e.g., the head) of the patient; and a positive Y direction along the Y-axis may be from the front side to the back side of the patient.

The tag data of image orientation may represent cosine values of angles between the axes of the image coordinate system associated with the first image and the axes of the patient coordinate system. For example, the tag data of image orientation may include six parameters (xx, xy, xz, yx, yy, yz). The parameters (xx, xy, xz) may represent cosine values of angles between the X-axis of the image coordinate system associated with the first image and the three axes of the patient coordinate system. The parameters (yx, yy, yz) may represent cosine values of angles between the Y-axis of the image coordinate system associated with the first image and the three axes of the patient coordinate system. In some embodiments, if the six parameters of the tag data of image orientation only include 0, 1, or −1, it may indicate that the first image is parallel to a plane of the patient coordinate system. If one of the six parameters of the tag data of image orientation is a decimal, it may indicate that there is an included angle between the first image and a plane of the patient coordinate system.

The tag data of patient position may represent a position of the patient relative to the medical device, a patient positioning mode (e.g., a head-first supine posture, a feet-first prone posture, a head-first left lateral recumbent posture, or a feet-first right lateral recumbent posture), a scan mode (e.g., a bed motion mode, a continuous bed motion scan, a step-and-shoot scan), or the like. In some embodiments, if the origin of the patient coordinate system and the origin of the first coordinate system coincide, the axis directions of the patient coordinate system may be different from the axis directions of the first coordinate system due to different scan modes.

In some embodiments, a transformation relationship between the patient coordinate system and the first coordinate system associated with the first medical device may be determined based on the tag data of patient position. A transformation relationship between the patient coordinate system and the image coordinate system associated with the first image may be determined based on the tag data of image position and the tag data of image orientation. A transformation relationship between the first coordinate system associated with the first medical device and the image coordinate system associated with the first image may be determined based on the transformation relationship between the patient coordinate system and the first coordinate system associated with the first medical device and the transformation relationship between the patient coordinate system and the image coordinate system associated with the first image. Further, the processing device 120 may determine the coordinates of the plurality of first elements in the first coordinate system associated with the first medical device based on the image coordinates of the plurality of first elements in the image coordinate system associated with the first image and the transformation relationship between the first coordinate system associated with the first medical device and the image coordinate system associated with the first image.

In 640, the processing device 120 (e.g., the generation module 420) may generate an initial first model based on the coordinates of the plurality of first elements in the first coordinate system associated with the first medical device.

In some embodiments, the processing device 120 may generate the initial first model in the first coordinate system based on the coordinates of the plurality of first elements in the first coordinate system associated with the first medical device. The initial first model may include a plurality of points having coordinates of the plurality of first elements in the first coordinate system associated with the first medical device. That is, a set of coordinates of the plurality of first elements in the first coordinate system associated with the first medical device may form the initial first model.

In 650, the processing device 120 (e.g., the generation module 420) may generate a first model by transforming the initial first model from the first coordinate system to the reference coordinate system (e.g., the second coordinate system) based on the first transformation relationship.

In some embodiments, the processing device 120 may determine coordinates of the plurality of first elements in the reference coordinate system (e.g., the second coordinate system associated with the second medical device) based on the coordinates of the plurality of first elements in the first coordinate system associated with the first medical device and the first transformation relationship. For example, for each first element of the plurality of first elements in the first coordinate system, the processing device 120 may determine coordinates (X2, Y2, Z2) of the first element in the second coordinate system based on the coordinates (X1, Y1, Z1) of the first element in the first coordinate system according to Equation (1). Further, the processing device 120 may generate the first model in the second coordinate system based on the coordinates of the plurality of first elements in the second coordinate system associated with the second medical device. The first model may include a plurality of points having coordinates of the plurality of first elements in the second coordinate system associated with the second medical device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
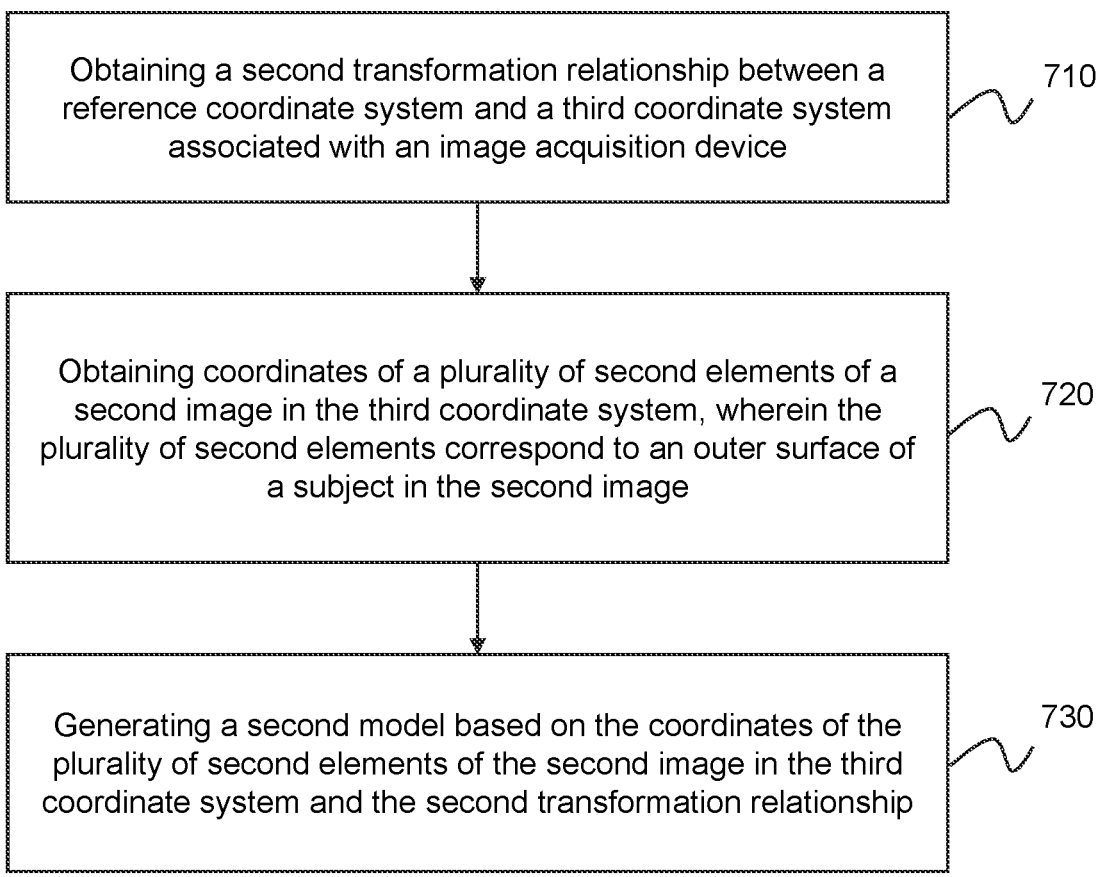
FIG. 7 is a flowchart illustrating an exemplary process for generating a second model of a subject based on a second image according to some embodiments of the present disclosure.

FIG. 7 is a flowchart illustrating an exemplary process for generating a second model of a subject based on a second image according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 710, the processing device 120 (e.g., the generation module 420) may obtain a second transformation relationship between a reference coordinate system (e.g., a second coordinate system associated with a second medical device) and a third coordinate system associated with an image acquisition device.

As used herein, a third coordinate system associated with an image acquisition device (e.g., a camera) refers to a coordinate system that uses the image acquisition device center as its origin and the optic axis as the Z-axis. The X-axis and Y-axis of the third coordinate system may define an image plane.

The second transformation relationship between the reference coordinate system (e.g., the second coordinate system) and the third coordinate system may represent a position relationship between the reference coordinate system (e.g., the second coordinate system) and the third coordinate system. In some embodiments, the second transformation relationship may be determined by one or more components (e.g., the processing device 120) of the medical system 100, or a user of the medical system 100, and stored in a storage device of the medical system 100. The processing device 120 may access the storage device and retrieve the second transformation relationship. For example, in a calibration process of the image acquisition device, the second transformation relationship between the second coordinate system and the third coordinate system may be determined.

In some embodiments, the processing device 120 may obtain a plurality of intrinsic parameters of the image acquisition device and a plurality of extrinsic parameters of the image acquisition device. The intrinsic parameters of the image acquisition device may represent the optical, geometric, and digital characteristics of the image acquisition device. For example, the intrinsic parameters of the image acquisition device may include fx, fy, u0, and v0. In some embodiments, u0 and v0 may be a number (or a count) of pixels between a center point of an image obtained by the image acquisition device and the origin of the third coordinate system associated with the image acquisition device along the X-axis direction and the Y-axis direction of the third coordinate system, respectively. In some embodiments, fx and fy may be determined according to Equations (2) and (3):

$$fx=F*Sx \quad (2),$$

$$fy=F*Sy \quad (3),$$

where F refers to an actual physical focal length of the image acquisition device; and Sx and Sy refer to a number (or a count) of pixels per unit along the X-axis direction and the Y-axis direction of the third coordinate system, respectively.

The extrinsic parameters of the image acquisition device may represent the relative location and orientation of the image capturing device with respect to a coordinate system associated with a medical device. For example, the extrinsic parameters of the image acquisition device may include rotation parameters (w, δ, θ) of the X-axis, the Y-axis, and the Z-axis of the third coordinate system, and translation parameters (Tx, Ty, Tz) of the X-axis, the Y-axis, and the Z-axis of the third coordinate system.

Further, the processing device 120 may obtain the second transformation relationship based on a position of the image acquisition device relative to the second medical device, the plurality of intrinsic parameters of the image acquisition device, and the plurality of extrinsic parameters of the image acquisition device. For example, in a pinhole camera model, the second transformation relationship may be determined based on a Zhang Zhengyou calibration method according to Equation (4):

$$s*\overline{m}=A[R,t]\overline{M} \quad (4),$$

where s refers to any value; $\overline{m}$ refers to 2D coordinates of a point in the third coordinate system associated with the image acquisition device; $\overline{M}$ refers to 3D coordinates of the point in the second coordinate system associated with the second medical device; R refers to a rotation matrix; A refers to an intrinsic parameter matrix; and t refers to a translation matrix. In some embodiments, Equation (4) may be represented by Equations (5) and (6):

$$H=A[R,t] \quad (5),$$

$$s*\overline{m}=H\overline{H} \quad (6),$$

where H is a homography matrix. In some embodiments, coordinates of a point in the third coordinate system associated with the image acquisition device may be determined according to a corner feature extraction algorithm. Coordinates (e.g., 3D coordinates) of the point in a coordinate system associated with a medical device (e.g., the second coordinate system associated with the second medical device) may be determined using a calibration plate. The matrix H for an image may be determined based on the coordinates of the point in the third coordinate system associated with the image acquisition device and the coordinates of the point in the coordinate system associated with the medical device (e.g., the second coordinate system associated with the second medical device). The coordinates (e.g., 3D coordinates) of the point in the second coordinate system associated with the second medical device may be determined based on the matrix H.

In 720, the processing device 120 (e.g., the generation module 420) may obtain coordinates of a plurality of second elements of a second image in the third coordinate system. The plurality of second elements correspond to an outer surface of a subject in the second image.

In some embodiments, the processing device 120 may obtain the coordinates of the plurality of second elements of the second image in the third coordinate system based on information (e.g., depth information) of the second image, a plurality of intrinsic parameters of the image acquisition device, and a plurality of extrinsic parameters of the image acquisition device. In some embodiments, the second image may include depth image data obtained by the image acquisition device 160 (e.g., a range sensing device, a structured light scanner, a TOF device, a stereo triangulation camera, a sheet of light triangulation device, an interferometry device, a coded aperture device, a stereo matching device). In some embodiments, the image acquisition device 160 (e.g., a depth camera) may obtain the depth image data according to a lidar depth imaging method, a computer stereo vision imaging method, a coordinate measuring machine method, a Moire fringe method, a structured light method, or the like. The depth image data may refer to image data that includes depth information of each physical point on a body surface of the subject, such as a distance from each physical point to a specific point (e.g., an optical center of the image acquisition device 160, an image plane of the image acquisition device 160). In some embodiments, the depth image data of the subject may reflect the geometry of the body surface of the subject.

In some embodiments, the depth image data may be transformed to point cloud data. The point cloud data may include a plurality of data points, each of which may represent a physical point on the body surface of the subject and can be described using one or more feature values of the physical point (e.g., feature values relating to the position and/or the composition of the physical point). In some embodiments, the processing device 120 may determine the point cloud data of the subject based on the depth image data of the subject obtained by the image acquisition device 160 (e.g. a 3D laser imaging device, a structured light scanner).

In some embodiments, an element value of a specific element in the second image may reflect a distance from a corresponding physical point to a specific point of the image acquisition device (e.g., an optical center of the image acquisition device 160, an image plane of the image acquisition device 160). In some embodiments, the processing device 120 may obtain element values of a plurality of elements of the second image based on the depth information of the second image. The processing device 120 may select the plurality of second elements corresponding to the outer surface of the subject from the plurality of elements of the second image. The processing device 120 may obtain the coordinates of the plurality of second elements of the second image in the third coordinate system based on coordinates of the plurality of second elements of the second image in an image coordinate system associated with the second image and a transformation relationship between the image coordinate system associated with the second image and the third coordinate system. As used herein, an image coordinate system associated with an image (e.g., the second image) obtained by an image acquisition device refers to a coordinate system that describes positions of pixels or voxels in the image obtained by the image acquisition device. The transformation relationship between the image coordinate system associated with the second image and the third coordinate system may be determined based on the plurality of intrinsic parameters of the image acquisition device and the plurality of extrinsic parameters of the image acquisition device.

In 730, the processing device 120 (e.g., the generation module 420) may generate a second model based on the coordinates of the plurality of second elements of the second image in the third coordinate system and the second transformation relationship.

In some embodiments, the processing device 120 may obtain coordinates of the plurality of second elements in the reference coordinate system (e.g., the second coordinate system) based on the second transformation relationship and the coordinates of the plurality of second elements of the second image in the third coordinate system. The processing device 120 may generate the second model based on the coordinates of the plurality of second elements in the reference coordinate system (e.g., the second coordinate system). The second model may include a plurality of points having the coordinates of the plurality of second elements in the reference coordinate system (e.g., the second coordinate system). That is, a set of coordinates of the plurality of second elements in the reference coordinate system (e.g., the second coordinate system) may form the second model.

According to some embodiments of the present disclosure, the second transformation relationship may be determined based on the position of the image acquisition device relative to the second medical device, the plurality of intrinsic parameters of the image acquisition device, and the plurality of extrinsic parameters of the image acquisition device, which may improve the accuracy of the determination of the second transformation relationship, and further improve the accuracy of the second model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for determining motion information of a subject, which is implemented on a computing device including at least one processor and at least one storage device, the method comprising:
    obtaining a first image of a subject, wherein the first image is obtained by performing a first scan on the subject using a first medical device of a first modality;
    obtaining a second image of the subject, wherein the second image is obtained by an image acquisition device during a second scan, and the second scan is performed on the subject using a second medical device of a second modality;
    generating a first model of the subject based on the first image;
    generating a second model of the subject based on the second image; and
    determining the motion information of the subject by registering the first model and the second model.

2. The method of claim 1, wherein the generating a first model of the subject based on the first image comprises:
    obtaining a first transformation relationship between a first coordinate system associated with the first medical device and a reference coordinate system; and
    generating the first model based on the first image and the first transformation relationship.

3. The method of claim 2, wherein the generating the first model based on the first image and the first transformation relationship comprises:
    obtaining a plurality of first elements of the first image by processing the first image, wherein the plurality of first elements correspond to an outer surface of the subject in the first image;
    determining coordinates of the plurality of first elements in the first coordinate system associated with the first medical device based on image coordinates of the plurality of first elements in an image coordinate system associated with the first image;
    generating an initial first model based on the coordinates of the plurality of first elements in the first coordinate system associated with the first medical device; and
    generating the first model by transforming the initial first model from the first coordinate system to the reference coordinate system based on the first transformation relationship.

4. The method of claim 3, wherein the obtaining a plurality of first elements of the first image by processing the first image comprises:
    obtaining the plurality of first elements by performing at least one of a binarization operation or a contour extraction processing operation on the first image.

5. The method of claim 2, wherein the reference coordinate system is a second coordinate system associated with the second medical device.

6. The method of claim 1, wherein the generating a second model of the subject based on the second image comprises:
    obtaining a second transformation relationship between the reference coordinate system and a third coordinate system associated with the image acquisition device; and
    generating the second model based on the second image and the second transformation relationship.

7. The method of claim 6, wherein the generating the second model based on the second image and the second transformation relationship comprises:
    obtaining coordinates of a plurality of second elements of the second image in the third coordinate system, wherein the plurality of second elements correspond to an outer surface of the subject in the second image; and
    generating the second model based on the coordinates of the plurality of second elements of the second image in the third coordinate system and the second transformation relationship.

8. The method of claim 7, wherein the generating the second model based on the coordinates of the plurality of second elements of the second image in the third coordinate system and the second transformation relationship comprises:
    obtaining coordinates of the plurality of second elements in the reference coordinate system based on the second transformation relationship; and
    generating the second model based on the coordinates of the plurality of second elements in the reference coordinate system.

9. The method of claim 6, wherein the reference coordinate system is the second coordinate system associated with the second medical device, and the obtaining a second transformation relationship between the reference coordinate system associated with the second medical device and a third coordinate system associated with the image acquisition device comprises:

obtaining a plurality of intrinsic parameters of the image acquisition device and a plurality of extrinsic parameters of the image acquisition device; and obtaining the second transformation relationship based on a position of the image acquisition device relative to the second medical device, the plurality of intrinsic parameters of the image acquisition device, and the plurality of extrinsic parameters of the image acquisition device.

10. The method of claim 1, wherein the determining motion information of the subject by registering the first model and the second model comprises:

determining the motion information of the subject by registering the first model and the second model according to an iterative closest point algorithm.

11. The method of claim 1, wherein the first model is a first point cloud model, the first point cloud model represents posture information of the subject in the first scan, the second model is a second point cloud model, and the second point cloud model represents posture information of the subject during the second scan.

12. The method of claim 1, further comprising:

obtaining a third image of the subject based on the second scan of the subject.

13. The method of claim 12, wherein the first medical device is a CT device, the second medical device is a PET device, the first image is a CT image, the third image is a PET image, and the method further comprising:

performing an attenuation correction operation on the PET image based on the CT image and the motion information of the subject.

14. A system for determining motion information of a subject, comprising:

at least one storage medium including a set of instructions; and at least one processor in communication with the at least one storage medium, wherein when executing the set of instructions, the at least one processor is directed to cause the system to perform operations comprising:

obtaining a first image of a subject, wherein the first image is obtained by performing a first scan on the subject using a first medical device of a first modality;

obtaining a second image of the subject, wherein the second image is obtained by an image acquisition device during a second scan, and the second scan is performed on the subject using a second medical device of a second modality;

generating a first model of the subject based on the first image;

generating a second model of the subject based on the second image; and determining the motion information of the subject by registering the first model and the second model.

15. The system of claim 14, wherein the generating a first model of the subject based on the first image comprises:

obtaining a first transformation relationship between a first coordinate system associated with the first medical device and a reference coordinate system; and generating the first model based on the first image and the first transformation relationship.

16. The system of claim 15, wherein the generating the first model based on the first image and the first transformation relationship comprises:

obtaining a plurality of first elements of the first image by processing the first image, wherein the plurality of first elements correspond to an outer surface of the subject in the first image;

determining coordinates of the plurality of first elements in the first coordinate system associated with the first medical device based on image coordinates of the plurality of first elements in an image coordinate system associated with the first image;

generating an initial first model based on the coordinates of the plurality of first elements in the first coordinate system associated with the first medical device; and generating the first model by transforming the initial first model from the first coordinate system to the reference coordinate system based on the first transformation relationship.

17. The system of claim 16, wherein the obtaining a plurality of first elements of the first image by processing the first image comprises:

obtaining the plurality of first elements by performing at least one of a binarization operation or a contour extraction processing operation on the first image.

18. The system of claim 14, wherein the generating a second model of the subject based on the second image comprises:

obtaining a second transformation relationship between the reference coordinate system associated with the second medical device and a third coordinate system associated with the image acquisition device; and generating the second model based on the second image and the second transformation relationship.

19. The system of claim 18, wherein the generating the second model based on the second image and the second transformation relationship comprises:

obtaining coordinates of a plurality of second elements of the second image in the third coordinate system, wherein the plurality of second elements correspond to an outer surface of the subject in the second image; and generating the second model based on the coordinates of the plurality of second elements of the second image in the third coordinate system and the second transformation relationship.

20. A non-transitory computer readable medium, comprising executable instructions that, when executed by at least one processor, direct the at least one processor to perform a method for motion correction, the method comprising:

obtaining a first image of a subject, wherein the first image is obtained by performing a first scan on the subject using a first medical device of a first modality;

obtaining a second image of the subject, wherein the second image is obtained by an image acquisition device during a second scan, and the second scan is performed on the subject using a second medical device of a second modality;

generating a first model of the subject based on the first image;

generating a second model of the subject based on the second image; and determining the motion information of the subject by registering the first model and the second model.

* * * * *